United States Patent
Tamura et al.

(10) Patent No.: US 7,216,976 B2
(45) Date of Patent: *May 15, 2007

(54) POLYURETHANE RESIN COMPOSITION FOR OPTICAL LENSES AND IMPACT STRENGTH SYNTHETIC RESIN LENSES

(75) Inventors: Kanichi Tamura, Osaka (JP); Shoichi Mitsuuchi, Osaka (JP); Chung-Tang Chang, Nantou (TW)

(73) Assignee: Talex Optical Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/409,852

(22) Filed: Apr. 10, 2003

(65) Prior Publication Data

US 2003/0195323 A1 Oct. 16, 2003

(30) Foreign Application Priority Data

Apr. 10, 2002 (JP) .............................. 2002-108079

(51) Int. Cl.
- G02C 5/00 (2006.01)
- G02C 7/02 (2006.01)
- G02C 7/10 (2006.01)
- G02C 7/12 (2006.01)
- G02C 7/16 (2006.01)

(52) U.S. Cl. ..................... 351/163; 264/1.1; 264/1.31; 264/1.32; 264/331.19; 351/41; 351/45; 351/49; 351/159; 351/177

(58) Field of Classification Search ................ 524/589, 524/590; 528/44, 61, 62, 63, 64; 351/41, 351/45, 49, 163, 159, 177; 264/1.1, 1.32, 264/1.31, 331.19

See application file for complete search history.

(56) References Cited

U.S. PATENT DOCUMENTS

| | | | | |
|---|---|---|---|---|
| 3,418,275 A | * | 12/1968 | Wayne | ........................ 528/348 |
| 4,927,901 A | | 5/1990 | Miyazaki | |
| 5,021,503 A | | 6/1991 | Nagata et al. | |
| 5,679,759 A | * | 10/1997 | Zhu et al. | ....................... 528/65 |
| 5,962,561 A | * | 10/1999 | Turshani et al. | ............ 524/140 |
| 6,127,505 A | | 10/2000 | Slagel | |
| 6,650,473 B2 | * | 11/2003 | Nakagoshi | ................... 359/490 |
| 6,734,272 B2 | * | 5/2004 | Tamura et al. | ................. 528/63 |

FOREIGN PATENT DOCUMENTS

| | | |
|---|---|---|
| CN | 1047093 | 11/1990 |
| CN | 1036204 | 10/1997 |
| EP | 1 197 505 | 4/2002 |

* cited by examiner

Primary Examiner—Patrick D. Niland
(74) Attorney, Agent, or Firm—Wenderoth, Lind & Ponack, LLP

(57) ABSTRACT

An impact strength synthetic resin lens is provided in which transparency of a synthetic resin lens material of a polyurethane and releasability are improved to improve productivity and no stria are produced. The impact strength synthetic resin lens is manufactured by casting and curing a polyurethane resin composition which a polyurethane resin composition for molding optical lenses, comprising, as essential components, a prepolymer obtained by reacting an alicyclic polyisocyanate having two or more isocyanate groups with a polyol having two or more hydroxy groups, an internal mold lubricant and a decolored aromatic diamine.

5 Claims, No Drawings

POLYURETHANE RESIN COMPOSITION FOR OPTICAL LENSES AND IMPACT STRENGTH SYNTHETIC RESIN LENSES

BACKGROUND OF THE INVENTION

The present invention relates to a polyurethane resin composition for optical lenses such as transparent lenses, sunglass lenses and polarized lenses, impact strength synthetic resin lenses produced by casting the composition, and a method of manufacturing the same.

Generally, plastic lenses are lightweight and less liable to crack compared to glass lenses and also easy to dye. Therefore, their use has spread from spectacle lenses to optomechanical lenses.

Also, interest of users in safety of spectacles has increased, and requirements for lenses particularly for sport and leisure sunglasses which will not crack are increasing. As representative lens materials, diethylene glycol bis(allyl carbonate) (hereinafter referred to as CR-39), polycarbonate resins, polyMMA resins, polystyrene resins, etc. can be cited.

But CR-39, polyMMA resins and polystyrene resins have poor impact strength and are liable to crack. Polycarbonate resins are superior in impact strength and not liable to crack, but have insufficient optical properties as lenses and are poor in chemical resistance and solvent resistance.

Thus, plastic lenses superior in impact strength and optical properties as well as solvent resistance are desired as materials for spectacle lenses, but no material that satisfies all such properties has been developed.

As molding methods for plastic lenses, hot-press molding, cast-molding, injection molding, etc. can be used. For molding of thermosetting resins such as CR-39 and urethane resins, casting is considered to be suitable.

In cast-molding plastic lenses, if internal sliding of flowing resin becomes poor, so-called "striae" (originally the term in the glass molding technique) tends to develop.

If the adhesion between the mold (of glass in many cases) and the thermosetting resin used is strong, releasability tends to worsen, thus worsening the productivity.

In order to cope with such problems, a method has been tried in which an external releasing agent is applied to a mold. But this worsened the surface accuracy of lenses, so that the production efficiency did not improve very much.

Also, since a urethane resin is a thermosetting resin obtained by reacting an aromatic isocyanate prepolymer with 4,4'-methylene bis(2-chloroaniline) and is superior in physical properties, anti-abrasion and impact resilience, it has widely been used for rolls, tires, belts, etc.

But since urethane resins contain aromatic isocyanate, which tends to change color, they cannot be used for applications in which thin colors are required.

An object of the present invention is to improve the transparency of a material for lenses made of a synthetic resin of a polyurethane resin family, which is superior in impact strength, and improve the releasability and productivity to provide a material from which impact strength and striae-free synthetic resin lenses can be manufactured.

Another object of the present invention is to provide a high-quality impact strength lens made of a synthetic resin and having impact strength and good in transparency and surface accuracy and having no striae, and to manufacture impact strength lenses made of a synthetic resin with stable quality and good efficiency.

SUMMARY OF THE INVENTION

According to the present invention, there is provided a polyurethane resin composition for molding optical lenses, comprising, as essential components, a prepolymer obtained by reacting an alicyclic polyiscyanate having two or more isocyanate groups with a polyol having two or more hydroxy groups, an internal mold lubricant and a decolored aromatic diamine.

The polyurethane resin composition for molding optical lenses according to the present invention is a molding material obtained by curing a prepolymer obtained by reacting an alicyclic polyisocyanate with a polyol having two or more hydroxy groups, with an aromatic diamine. This material has a longer pot life compared with a conventional polyurethane-family lens molding material obtained by curing an aromatic isocyanate with an aromatic polyamine. Thus it is possible to take a sufficient time for precise molding work.

The aliphatic cyclic polyisocyanate may be one or more alicyclic polyisocyanates selected from the group consisting of 4,4'-methylene bis (cyclohexylisocyanate), isophorone diisocyanate, 2,5(6)-diisocyanate methyl-bicyclo[2,2,1]heptane, and bis(isocyanatemethyl) cyclohexane.

Also, since the polyurethane resin composition for molding optical lenses according to this invention contain an internal mold lubricant, releasability is good even in general-purpose glass molds, so that the molding efficiency improves. Also, impact strength lenses can be manufactured which will not stick to molds and are superior in the surface accuracy of lenses, have no striae and are good in the accuracy.

If as the internal mold lubricant, an alkyl phosphate ester salt and/or a fluorine-family nonionic surface active agent are used, a polyurethane resin composition is provided from which high-quality optical lenses which are good in releasability, free of striae, and superior in surface accuracy can be reliably obtained.

If as the decolored aromatic diamine, 4,4'-methylene bis(2-chloroaniline) refined to a Gardner color scale of two or less and stabilized by adding an antioxidant is used, the polyurethane resin composition will be high in transparency because it has no tinting. Also, since an alicyclic polyisocyanate is employed, casting can be carried out at a relatively low temperature. This prevents yellowing of the aromatic diamine after heating. Thus there is provided an impact strength lens which can also be used as a lens for which light-colored or colorless transparency is required.

Also, according to the present invention, there is provided an impact strength synthetic lens formed by casting and curing the polyurethane resin composition.

Further, according to the present invention, there is provided a method of manufacturing impact strength synthetic resin lenses comprising the steps of preparing a prepolymer by reacting an aliphatic polyisocyanate having two or more isocyanate groups with a polyol having two or more hydroxy groups, adding an internal mold lubricant to the prepolymer, blending a decolored aromatic diamine, and casting and curing the mixture.

DETAILED DESCRIPTION OF THE PREFERRED EMBODIMENT

The alicyclic polyisocyanate used in this invention may be a compound having at least two or more isocyanate groups. For example, one or more alicyclic polyisocyanates selected from the group consisting of 4,4'-methylene bis (cyclohexylisocyanate), isophorone diisocyanate, 2,5(6)-diisocyanate methyl-bicyclo(2,2,1) heptane, and bis(isocyanatemethyl)cyclohexane may be used.

An alicyclic polyisocyanate can be said to be a non-yellowing type polyisocyanate. By curing it by use of a predetermined decolored aromatic diamine, yellowing property of urethane resin is reliably suppressed.

Also, the speed of reaction of the prepolymer (obtained by reacting such a polyisocyanate with a polyol) with an aromatic diamine is relatively moderate, so that the pot life prolongs. Thus, a sufficient time is assured for casting, so that accuracy of casting improves.

The polyol compound used in this invention comprises A: a polyester polyol or a polyether polyol having an average molecular weight (MW) of 500–1500, and B: a polyol having an average molecular weight (MW) of 60–300. It is preferable to use A alone or a mixture of A and B.

As polyester polyols having an average molecular weight of 500–1500, for example, known polyester diols such as 1,4-butanediol adipate, 1,6-hexanediol adipate, caprolactonediol may be used. Also, as polyether polyols, polytetramethylene ether glycol and the like may be used.

As polyols B having an average molecular weight of 60–300, diols such as ethylene glycol, diethylene glycol, propylene glycol and 1,4-butylene glycol, and triols such as trimethylol ethane and trimethylol propane may be used. They are a part of compounds usable in this invention and not limited thereto.

As the polyol compound A used in this invention, a polyether diol is especially preferable. The viscosity of the prepolymer obtained by reacting the polyisocyanate with a polyol is lower if a polyether diol is blended in a large amount. The viscosity can be adjusted so as to be advantageous for casting work.

The high-molecular weight diol component contributes to improvement in impact properties as a soft segment of the cured resin. The low-molecular diol or triol component is considered to contribute to strength, hardness and solvent resistance.

The reaction molar ratio (NCO/OH) between the alicyclic polyisocyanate and the polyol in this invention should be 2.0–4.0 and the isocyanate content of the prepolymer obtained should be 8.0–16.0%.

If the reaction molar ratio and the isocyanate content are less than the lower limits of the predetermined ranges, the viscosity of the prepolymer would be too high, so that the casting would become difficult. Besides, the hardness of plastic lenses obtained by curing would become low. If the reaction molar ratio and the isocyanate content are above the upper limits of the predetermined ranges, the viscosity would become too low. Thus, while casting is easy, the balance of physical properties of cured resins worsens.

The prepolymer is manufactured by reacting at 70–120° C. for 10–5 hours as in the conventional method.

The decolored aromatic diamine used in this invention may be 4,4'-methylene bis(2-chloroaniline) (hereinbelow abbreviated to MOCA) decolored to white or light color close to white by refining by a predetermined method. It is extremely low in the coloring property.

By the way, aromatic diamines used for general purposes (hereinafter referred to as general-purpose MOCA) are yellow-colored presumably because they contain impurities, and when melted for reacting with a prepolymer, they are gradually oxidized and change in color from brown to blackish brown.

On the other hand, decolored aromatic diamine comprising 4,4'-methylene bis(2-chloroaniline) refined to the Gardner color scale of 2 or less by a predetermined method is of a light-colored (or white-colored) family refined to a high degree, as is called white MOCA (WM). The specific refining method is by mixing particulate activated carbon of 200 mesh or less with an organic solvent such as toluene and homogeneously dispersing it, and mixing while stirring with general-purpose MOCA which has been heated under reduced pressure and melted. By doing so, activated carbon and general-purpose MOCA contact each other with extremely high efficiency, so that impurities having coloring substance adsorb to the activated carbon.

Next, when evaporation is carried out under reduced pressure, the MOCA and activated carbon (containing impurities), which are dissolved in an organic solvent, will separate. By evaporating the organic solvent, MOCA decolored to white or light color close to white can be obtained.

To the aromatic diamine thus refined by removing impurities, an antioxidant (also referred to as a heat stabilizer) is preferably added to prevent discoloration.

If the antioxidant is a phenol-family antioxidant or a phosphorus-family antioxidant, it is possible to ensure stability to heat. For example, Irganox (made by Chiba Geigy) which is a hindered phenol family antioxidant or Irgafos (made by Ciba Geigy) which is a phosphorus family antioxidant may be used.

Generally, it is not recommended to mix additives beforehand in the isocyanate prepolymer, which is high in reactivity. But the internal mold lubricant used in this invention is preferably added in the prepolymer beforehand.

Representative internal mold lubricants used in this invention are alkyl phosphate ester salts and fluorine-family nonionic surface active agents. They are blended alone or in combination in the prepolymer. The adding amount should be 10–5000 ppm to the prepolymer. The adding amount can be adjusted according to the composition of the prepolymer, the isocyanate content, the thickness of the lenses, etc. It may be over 5000 ppm. While various alkyl phosphate ester salts are available, specifically, one made by Chukyoyushi (Separl) is preferable.

Also, as specific examples of fluorine-family nonionic surface active agents, Unidyne made by Daikin Industries Ltd and Megafac made by Dainippon Ink & Chemicals can be cited.

The reaction molar ratio (NCO/NH$_2$) between the prepolymer and the aromatic diamine according to this invention is 0.9–1.1. The reaction is complete by heating for curing at 60–120° C. for 40–20 hours after injecting into a glass mold. The curing conditions are not limited to the above because they vary with the kind of isocyanate.

In this invention, in order to improve weather resistance and discoloring property, antioxidants, Uv absorbers, light stabilizers may be added in suitable amounts.

Also, by adding a dye that dissolves in the prepolymer, it is possible to improve the appearance of plastic lenses that tend to yellow. A blue-family dye or a violet-family dye may be added by 1–10 ppm with respect to the prepolymer.

The steps of manufacturing the plastic lens superior in impact strength according to this invention are as follows.

Firstly, a prepolymer is formed by reacting an alicyclic polyisocyanate with a polyol, and additives such as an internal mold lubricant, antioxidants, Uv absorbers, etc. are dissolved therein. The prepolymer solution obtained is deaerated under reduced pressure while keeping the temperature at 50–100° C., mixed with 4,4'-methylene bis(2-chloroaniline) which has been melted at 120° C., and defoamed under reduced pressure. The mixture is injected into a glass lens mold for heat curing. After allowed to cool, a plastic lens molded is released from the mold.

The thus manufactured urethane-family plastic lens according to this invention is superior in impact strength, will not crack easily, and will not crack even if it is struck with a hammer. Further, this lens is superior in transparency and surface accuracy and good in optical properties, too. Thus it can be used as various lenses such as a spectacle lens.

Also, by subjecting the lens of this invention to dying, hard-coating, reflection-preventive treatment, color coating, mirror coating, etc., lenses having added values are provided.

EXAMPLES AND COMPARATIVE EXAMPLES

Example 1

Examples of this invention will be specifically described below. In Examples, parts and % are parts by weight and wt % unless otherwise specified.

In a 500 ml separable flask provided with a thermometer, stirrer and seal pipe, 200 parts of polytetramethylene ether glycol (PTG1000 made by Hodogaya Chemical Industry, average molecular weight (MW): 1000) as a polyol component A and 4 parts of trimethylol propane (TMP) as a polyol component B were blended. The mixture was heated while stirring in a nitrogen gas flow, and it was dehydrated under reduced pressure of 5–10 mmHg at 100° C. for one hour. After dehydration, it was cooled, 224 parts of 4,4'-methylene bis(cyclohexylisocyanate (made by SUMITOMO Bayer Urethane: Desmodur W) as an isocyanate component $H_{12}$ MDI was added at 80° C., and reacted at 100–110° C. for eight hours to obtain a prepolymer. The reaction molar ratio (NCO/OH) was 3.5.

To the prepolymer, 1000 ppm of Separl 441–100 made by Chukyoyushi as an internal mold lubricant A, and 200 ppm of Megafac F-470 made by Dainippon Ink as an internal mold lubricant B, and 0.5% of UV absorber (made by Chemipro Kasei: Kemisorb 111) were added and dissolved. The prepolymer obtained was light yellowish and transparent, the NCO content was 11.8%, the viscosity was 7000 mPa·s (30° C.).

After reducing pressure at 80° C. and deaerating 100 parts of the prepolymer obtained, light-colored MOCA (WM) as a decolored diamine component was melted at 120° C., added by 37.5 parts and mixed in the prepolymer.

The light-colored MOCA used here is a decolored MOCA (WM) obtained by mixing particulate activated carbon of 200 mesh or less with toluene so as to dissolve homogeneously, stirring and mixing with general-purpose MOCA obtained by heating and melting under reduced pressure, and separating the MOCA and the activated carbon (containing impurities) by carrying out distillation under reduced pressure, and evaporating the organic solvent. As an example of a commercially available MOCA, ISOCROSS WM manufactured by SHUANG BANG Industrial Corporation in Taiwan can be named.

After mixing the mixture of the prepolymer and the decolored MOCA (WM) in a mixing defoaming machine for one minute, it was infected into a glass mold that has been preheated to 100° C., and it was cured at 100° C. for 20 hours. The reaction molar ratio (NCO/NH$_2$) was set at 1.0. The lens molded by cooling after curing was released from the mold. The releasability was good and a transparent lens free of striae was obtained.

The plastic lenses thus manufactured were evaluated for the following test items. The test results are shown in Table 1.

① Releasability: ○ shows that the lens was easily released when cooled to normal temperature after curing at 100° C. for 20 hours, Δ shows that the lens was released but not easily, and X shows that the lens could not be released.

② Existence of striae: The plastic lenses were visually evaluated. ○ shows that the lens had no striae. X shows that the lens had a striae.

③ Existence of haze: The plastic lenses were visually evaluated. ○ shows that the lens had no haze and Δ shows that it had a slight haze.

④ Refractive index: Using an Abbe refractometer, the refractive index of the D line was measured at 20° C.

⑤ Abbe number: Measured at 20° C. using an Abbe refractometer.

⑥ Hardness: Measured using a hardness meter (JIS, D).

⑦ Impact strength: A flat chisel weighing 1 kg was let to drop from the height of 2 meters toward a plastic lense on an iron plate. ○ shows that the chisel stuck in the lens and X shows that the lens cracked.

⑧ YI value: Molded plates of a size 50×50×5 mm were made of the same material as the lenses, and the yellowness index was measured by use of a color difference meter.

Comparative Example 1-A

Except that neither of the internal mold lubricants A, B was added, a prepolymer was prepared in the same manner as in Example 1, and test pieces of lenses were formed from the prepolymer by casting and curing. After curing, release of the lens from the mold was tried by cooling. But it was impossible to release and no lenses could be manufactured. It was found out that unless an internal mold lubricant is added, it is impossible to manufacture plastic lenses with this composition because adhesion to a glass mold is strong.

Comparative Example 1-B

Except that the internal mold lubricant A was not added, a prepolymer was made in the same manner as in Example 1, and test pieces of lenses were formed from the prepolymer by casting and curing. After curing, lenses were released by cooling. But they could not be released easily, and the glass mold was damaged. The plastic lenses manufactured were evaluated for the test items ①–⑧. The test results are shown in Table 1.

Comparative Example 1-C

Except that instead of the diamine component WM, a diamine component A (Bisamine A made by Wakayama Seika Kogyo Co., Ltd.) was used, the resin composition was cast and cured in the same manner as in Example 1. The lenses obtained were strong in yellowness, so that the YI value markedly exceeded the predetermined range. The plastic lenses manufactured were evaluated for the test items ①–⑧, and the test results are shown in Table 1.

Example 2

Using the reacting device used in Example 1, 200 parts of polytetramethylene ether glycol (made by Mitsubishi Chemical Corp.: PTMG650, average molecular weight: 650) as a polyol component A' and 4 parts of trimethylol propane (TMP) as a polyol component B were blended. The mixture was dehydrated in the same manner as in Example 1. After dehydration, the mixture was cooled, 196 parts of isophorone diisocyanate (made by Sumitomo Bayer Urethane: Desmodur I) as an isocyanate component IPDI was added at 80° C., and the mixture was reacted at 100–110° C. for four hours to obtain a prepolymer. The reaction molar ratio (NCO/OH) was 2.5.

To the prepolymer, an internal mold lubricant A was added by 500 ppm and an internal mold lubricant B was added by 200 ppm and Kemisorb 111 as a UV absorber was added by 0.5% and dissolved. The prepolymer obtained was light yellowish and transparent, the NCO content was 10.9%, and the viscosity was 11000 mPa·s (30° C.)

After 100 parts of the prepolymer and 34.6 parts of the diamine component WM were mixed and defoamed in the same manner as in Example 1, the mixture was injected into a mold and cured at 100° C. for 20 hours. The reaction molar ratio (NCO/NH$_2$) was 1.0. After curing, it was easily released from the mold, and transparent lenses free of striae were obtained. The plastic lenses obtained were evaluated for the test items ①–⑧, and the test results are shown in Table 2.

Comparative Example 2-A

Except that neither of the internal mold lubricants A and B was not added, casting and curing were done in the same manner as in Example 2. Trials were made to release the lens from the glass mold but it did not release. Thus it was impossible to manufacture lenses.

Comparative Example 2-B

Except that instead of the diamine component WM, a diamine compound MT (Cuamine Mt made by Ihara Chemical Industry Co., Ltd) was used as a diamine component, it was cast and cured in the same manner as in Example 2. The plastic lenses manufactured were evaluated for the test items ①–⑧. The test results are also shown in Table 2.

Releasing was as good as in Example 2. But the lenses obtained were strong in yellowness, so that the YI value was high.

Comparative Example 2-C

Except that a fluorine-family nonionic surface active agent (Unidyne DS-401 made by Daikin Industries LTD.) was used as the internal mold lubricant C, casting and curing were done in the same manner as in Example 2. Lenses could be released. But the work was not easy, haze was recognized in the lenses, and compatibility with the mold lubricant was insufficient. The plastic lenses manufactured were evaluated for the test items ①–⑧. The test results are shown in Table 2.

Example 3

Using the reaction device of Example 1, 200 parts of the polyol component A and 8 parts of trimethylol propane (TMP) as the polyol component B were blended in a separable flask, and dehydrated under the same conditions as in Example 1. After dehydration, the mixture was cooled, and as the isocyanate component, 179 parts of norbornane diisocyanate, i.e. 2,5(6)-diisocyanate methyl-bicyclo[2,2,1] heptane (cosmonate NBDI made by Mitsui-Takeda Chemical) was added at 80° C. The mixture was reacted for four hours at 100–110° C. to obtain a prepolymer with the reaction molar ratio (NCO/OH) at 3.0.

To the prepolymer, 500 ppm of the internal mold lubricant A, 200 ppm of the internal mold lubricant B, and as a UV absorber, 0.5% of Kemisorb 111 made by Chemipro Kasei, and 5 ppm of Oplas violet 730 (made by Orient Chemical Industries LTD.) of a violet-family dye were added and dissolved.

The prepolymer obtained was light bluish and transparent, the NCO content was 12.6%, and the viscosity was 5000 mPa·s (30° C.).

Next, after 100 parts of the prepolymer and 40.0 parts of the diamine component WM were mixed and defoamed in the same manner as in Example 1, the mixture was injected into a mold and cured for 20 hours at 100° C. The reaction molar ratio (NCO/NH$_2$) was 1.0.

After curing, the lens was cooled and released from the mold. Releasing was easy. Transparent lenses which were free of striae and slightly bluish were obtained. They were evaluated for the test items ①–⑧. The results are shown in Table 2.

Comparative Example 3

Using the reaction device of Example 1,200 parts of the polyol component A and 8 parts of the polyol component B (TMP) were blended in a separable flask, and dehydrated under the same conditions as in Example 1. After dehydration, the mixture was cooled, and as the isocyanate component XDI, 163 parts of xylylene diisocyanate (Takenate 500 made by Mitsui-Takeda Chemical) was added, and it was reacted for four hours at 80–90° C. to obtain a prepolymer. The reaction molar ratio (NCO/OH) was 3.0.

To the prepolymer, 1000 ppm of the internal mold lubricant A and 200 ppm of the internal mold lubricant B, and 0.5% of Kemisorb as a UV absorber were added and dissolved. The prepolymer obtained was light yellowish and transparent, the NCO content was 12.8%, and the viscosity was 1600 mPa·s (30° C.).

Next, in the same manner as in Example 1,100 parts of the prepolymer and 40.7 parts of the diamine component WM were added and defoamed. When trial was made to inject the mixture into a mold, the viscosity was too high to inject it. The viscosity of the prepolymer was low, so that the workability appeared to be good. But the pot life after mixing was short and it could not be used.

Since the present invention is a polyurethane resin composition for molding optical lenses, comprising, as essential components, a prepolymer obtained by reacting an alicyclic polyisocyanate having two or more isocyanate groups with a polyol having two or more hydroxy groups, an internal mold lubricant and a decolored aromatic diamine, compared with a case in which a prepolymer using an aromatic polyisocyanate is used, the pot life is longer, so that precise molding is possible. Also, since it contains an internal mold lubricant, releasability is good in general-purpose molds. Thus molding efficiency improves. Further, lenses that do not stick to the mold and are superior in surface accuracy can be obtained, and impact strength lenses that are free of striae and good in accuracy can be obtained.

That is, the polyurethane resin composition for molding optical lenses according to this invention is a material which improves the transparency of the material of a polyurethane resin family, which improves the releasability and thus productivity, and with which impact strength synthetic resin lenses can be manufactured which are free of striae.

Also, in the invention relating to the method of manufacturing impact strength synthetic resin lenses, since lenses are molded from the above-described polyurethane resin composition, striea-free, high-quality, impact strength synthetic resin lenses can be manufactured which are good in transparency and surface accuracy, and such synthetic resin lenses can be manufactured efficiently with their quality stabilized.

TABLE 1

|  | Ex. | Comp. Ex. | | |
| --- | --- | --- | --- | --- |
|  | 1 | 1-A | 1-B | 1-C |
| Component |  |  |  |  |
| Isocianate | H$_{12}$MDI | H$_{12}$MDI | H$_{12}$MDI | H$_{12}$MDI |
| Polyol A | PTG1000 | PTG1000 | PTG1000 | PTG1000 |
| Polyol B | TMP | TMP | TMP | TMP |
| Mold lubricant A | 1000 ppm | 0 | 0 | 1000 ppm |
| Mold lubricant B | 200 ppm | 0 | 200 ppm | 200 ppm |
| Mold lubricant C | 0 | 0 | 0 | 0 |
| UV absorber | 0.5% | 0.5% | 0.5% | 0.5% |
| Dye | 0 | 0 | 0 | 0 |
| Diamine | WM | WM | WM | A |
| Property evaluation |  |  |  |  |
| ① Releasability | ○ | X | Δ | ○ |
| ② Striae | ○ | — | ○ | ○ |
| ③ Haze | ○ | — | ○ | ○ |
| ④ Refractive index | 1.55 | — | 1.55 | 1.55 |
| ⑤ Abbe number | 38 | — | 38 | 37 |
| ⑥ Hardness | 81D | 81D | 81D | 81D |
| ⑦ Impact strength | ○ | — | ○ | ○ |
| ⑧ YI value | −1.0 | −0.5 | −1.0 | 28.0 |

TABLE 2

|  | Ex. | Comp. Ex. | | | Ex. | Comp. Ex. |
| --- | --- | --- | --- | --- | --- | --- |
|  | 2 | 2-A | 2-B | 2-C | 3 | 3 |
| Component |  |  |  |  |  |  |
| Isocianate | IPDI | IPDI | IPDI | IPDI | NBDI | XDI |
| Polyol A, A' | PTG650 | PTG650 | PTG650 | PTG650 | PTG1000 | PTG1000 |
| Polyol B | TMP | TMP | TMP | TMP | TMP | TMP |
| Mold lubricant A | 500 ppm | 0 | 500 ppm | 0 | 500 ppm | 1000 ppm |
| Mold lubricant B | 200 ppm | 0 | 200 ppm | 0 | 200 ppm | 200 ppm |
| Mold lubricant C | 0 | 0 | 0 | 500 ppm | 0 | 0 |
| UV absorber | 0.5% | 0.5% | 0.5% | 0.5% | 0.5% | 0.5% |
| Dye | 0 | 0 | 0 | 0 | 500 ppm | 0 |
| Diamine | WM | WM | MT | WM | WM | WM |
| Property evaluation |  |  |  |  |  |  |
| ① Releasability | ○ | X | ○ | Δ | ○ | — |
| ② Striae | ○ | — | ○ | ○ | ○ | — |
| ③ Haze | ○ | — | ○ | Δ | ○ | — |
| ④ Refractive index | 1.54 | — | 1.54 | 1.54 | 1.55 | — |
| ⑤ Abbe number | 37 | — | 36 | 37 | 37 | — |
| ⑥ Hardness | 83D | 82D | 83D | 83D | 81D | — |
| ⑦ Impact strength | ○ | — | ○ | ○ | ○ | — |
| ⑧ YI value | 1.0 | −0.5 | 32.0 | −1.0 | −5.5 | — |

What is claimed is:

1. A polarized lens comprising a polyurethane resin composition for molding optical lenses, comprising, as essential components, a prepolymer having an isocyanate content of 8.0–16.0% obtained by reacting an alicyclic polyisocyanate having two or more isocyanate groups with a polyol having two or more hydroxy groups, an internal mold lubricant and a decolored aromatic diamine, wherein said decolored aromatic diamine is 4,4'-methylene bis(2-chloroaniline) refined to a Gardner color scale of two or less and stabilized by adding an antioxidant.

2. A polarized lens comprising a polyurethane resin composition for molding optical lenses, comprising, as essential components, a prepolymer having an isocyanate content of 8.0–16.0% obtained by reacting an alicyclic polyisocyanate having two or more isocyanate groups with a polyol having two or more hydroxy groups, an internal mold lubricant and a decolored aromatic diamine, wherein as said internal mold lubricant, an alkyl phosphate ester salt and a fluorine-family nonionic surface active agent are used.

3. An impact-resistant polarized lens manufactured by casting and curing a polyurethane resin composition comprising, as essential components, a prepolymer having an isocyanate content of 8.0–16.0% obtained by reacting an alicyclic polyisocyanate having two or more isocyanate groups with a polyol having two or more hydroxy groups, an internal mold lubricant and a decolored aromatic diamine, wherein said decolored aromatic diamine is 4,4'-methylene bis(2-chloroaniline) refined to a Gardner color scale of two or less and stabilized by adding an antioxidant, and wherein as said internal mold lubricant, an alkyl phosphate ester salt and a fluorine-family nonionic surface active agent are used.

4. A method of manufacturing impact-resistant polarized synthetic resin lenses comprising the steps of preparing a prepolymer by reacting an alicyclic polyisocyanate having two or more isocyanate groups with a polyol having two or more hydroxy groups, adding an internal mold lubricant to said prepolymer, blending a decolored aromatic diamine, and casting and curing the mixture, wherein said decolored aromatic diamine is 4,4'-methylene bis(2-chloroaniline) refined to a Gardner color scale of two or less and stabilized by adding an antioxidant, and wherein as said internal mold lubricant, an alkyl phosphate ester salt and a fluorine-family nonionic surface active agent are used.

5. An impact-resistant polarized lens as claimed in claim 3, wherein said alicyclic polyisocyanate is one or more alicyclic polyisocyanates selected from the group consisting of 4,4'-methylene bis(cyclohexylisocyanate), isophorone diisocyanate, 2,5 (6)-diisocyanate methyl-bicyclo [2,2,1] heptane, and bis(isocyanatemethyl)cyclohexane.

* * * * *